United States Patent [19]

Galardi

[11] Patent Number: 5,429,844
[45] Date of Patent: Jul. 4, 1995

[54] REVEAL MOLDING WITH COACTING GRIPPING STRUCTURE

[75] Inventor: Christopher A. Galardi, Dearborn Heights, Mich.

[73] Assignee: The Standard Products Company, Cleveland, Ohio

[21] Appl. No.: 248,420

[22] Filed: May 24, 1994

[51] Int. Cl.⁶ .................................................. B60J 1/20
[52] U.S. Cl. .......................................... 428/31; 428/99; 428/120; 296/93; 52/208
[58] Field of Search ............................ 428/31, 99, 120; 296/93; 52/208

[56] References Cited

U.S. PATENT DOCUMENTS

| | | | |
|---|---|---|---|
| 3,851,432 | 12/1974 | Griffin | 52/400 |
| 4,478,020 | 10/1984 | Jackson | 52/309.13 |
| 4,813,733 | 3/1989 | Gustafson et al. | 296/93 |
| 4,833,847 | 3/1989 | Inayama et al. | 52/208 |
| 4,850,640 | 7/1989 | Gold | 296/201 |
| 4,916,873 | 4/1990 | Keys | 52/208 |
| 5,001,876 | 3/1991 | Harper et al. | 52/208 |
| 5,032,444 | 7/1991 | Desir, Sr. | 428/122 |

*Primary Examiner*—Alexander S. Thomas
*Attorney, Agent, or Firm*—Harness, Dickey & Pierce

[57] ABSTRACT

The reveal molding has a centrally located barbed stem and an umbrella-shaped cap designed to fill and span an elongated gap between adjacent structural members such as between body panel and glass window. A stabilizer portion depends from the underside of the umbrella portion and is provided with a sawtoothed gripping structure designed to mate with a complementary sawtooth structure formed on the sidewall of the stem. The umbrella portion and stem are designed to allow hinged flexing action during installation and this action is thereafter restrained by the interlocking gripping structures once the molding is installed.

14 Claims, 1 Drawing Sheet

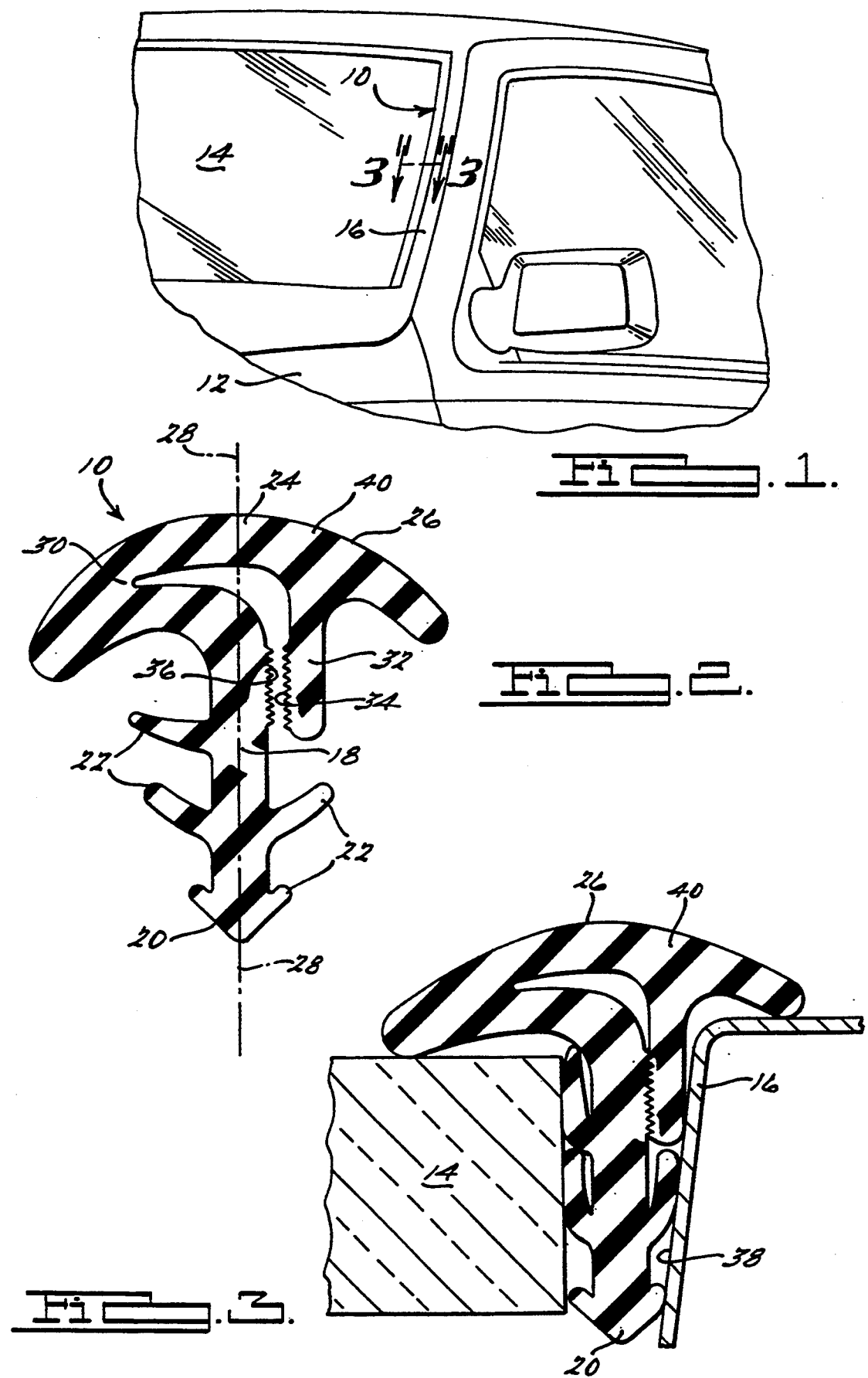

REVEAL MOLDING WITH COACTING GRIPPING STRUCTURE

BACKGROUND AND SUMMARY OF THE INVENTION

The present invention relates generally to molding adapted to cover and seal and elongated gap when partially inserted therein. More particularly, the invention relates to a sealing and decorative molding for use with an automotive vehicle and especially adapted to cover and seal the open space or channel which extends around the periphery of a fixed glass window between the glass and associated body part of the automotive vehicle.

In the manufacture of automotive vehicles, fixed glass windows are commonly mounted on an automotive structural portion such as a body part. By way of example, windshields and rearwardly facing hatch windows may be mounted in this fashion. Typically, the fixed glass window or first structural portion is placed adjacent the body part or second structural portion leaving a gap or channel extending around the perimeter to provide tolerance in the relative sizing of the two structural portions. This channel or gap facilitates installation of the glass in the frame and accommodates differences in expansion between the glass and the body part. On the other hand, the channel or gap is unsightly and provides a place for dirt, water, snow and the like to accumulate. Hence an elongated molding or gasket is conventionally inserted in the gap to improve the visual appearance of the vehicle. While a closely fitted, securely retained and centered gasket it is difficult to achieve in practice, because the glass and frame sometimes do not provide coplanar, outwardly facing surfaces on opposite sides of the channel. In addition, sometimes the channel will vary in width around the periphery of the glass, and this makes it more difficult to ensure a good, tight fit at all places around the periphery. Furthermore, sometimes, when the gasket or molding is fitted around a sharp corner, such as around the four corners of a generally rectangular window, the gasket or molding may curl up or buckle, often times shortly after installation.

While there have been a number of different gasket and molding designs proposed for these applications, there remains considerable room for improvement.

accordance with the present invention a reveal molding is provided for covering the elongated gap between two adjacent structural portions, such as between an automotive body portion and a fixed glass window. The reveal molding comprises a stem portion for insertion into the gap and an umbrella portion connected to the stem portion, for covering the adjacent structural portions which define the gap. The reveal molding further includes a stabilizer portion connected to the umbrella portion for insertion into the gap adjacent the stem portion. The stem portion and stabilizer portion have coacting gripping means for locking together to thereby inhibit the umbrella portion from moving away from the structural portions.

For a more complete understanding of the invention, its objects and advantages, reference may be had to the following specification and to the accompanying drawings.

BRIEF DESCRIPTION OF THE DRAWINGS

FIG. 1 is a partial perspective view illustrating the reveal molding of the present invention in place about the periphery of a windshield of an automotive vehicle;

FIG. 2 is a cross-sectional view of the reveal molding in a relaxed condition prior to installation;

FIG. 3 is a cross-sectional view taken along the line 3—3 of FIG. 1, illustrating the reveal molding in an installed condition.

DESCRIPTION OF THE PREFERRED EMBODIMENT

Referring to FIG. 1, the reveal molding of the present invention is illustrated generally at 10. As illustrated, the reveal molding is installed on a structural portion of an automotive vehicle 12 such as body portion 16. The reveal molding extends around the periphery of a second body portion such as windshield 14.

Reveal molding 10 may be fabricated from a suitable elastic material such as polyvinyl chloride. The molding may preferably be formed as an elongated molding which can be cut to fit any desired periphery. The durometer of the plastic material used for reveal molding 10 is selected to provide and assure a desired level of rigidity and interference fit between the vehicle body portion 16 and windshield 14. The presently preferred embodiment is extruded of polyvinyl chloride having a hardness of durometer, shore A 85.

Referring to FIG. 2, the cross-section of reveal molding 10 is illustrated. Reveal molding includes stem portion 18 having a barbed tip 20 and having a plurality of barbed extensions 22, which are of sufficient length to make contact with vehicle body portion 16 and windshield 14, when installed (see FIG. 3). The barbed extensions 22 are of sufficient length so that a good, tight interference fit is established when the reveal molding is installed.

The reveal molding further includes an umbrella portion 24 which has an exterior surface 26 which may be colored or provided with a decorative covering, if desired. Umbrella portion 24 is preferably formed so that it is generally centrally disposed above the stem portion 18. Thus exterior surface 26 exhibits generally bilateral symmetry about the medial axis 28 of stem portion 18. The stem portion and umbrella portion are preferably joined together during extrusion or by coextrusion to form a flexible hinge portion 30. The flexible hinge portion allows changing the angular position of the umbrella to flex or pivot with respect to medial axis 28 during installation of the reveal molding 10. This flexing action helps during installation by allowing the molding to be conformed to the desired periphery. After installation, however, the flexing is largely inhibited by the stabilizer and gripper structure described below.

With continued reference to FIG. 2, the reveal molding includes a downwardly depending stabilizer portion 32. Which is preferably integrally formed during extrusion. Stabilizer portion is attached to the underside of umbrella portion 24 and extends approximately one-third to one-half the length of stem portion 18. Stabilizer portion 32 and stem portion 18 are each provided with coacting gripping structures 34 and 36, respectively. These gripping structures may be in the form of sawtooth configurations designed to lock together and thereby inhibit the umbrella portion from moving away from the body portion 16 when installed. As seen in FIG. 3, the gripping structures 34 and 36 mate together to effectively inhibit flexing or hinging movement of the umbrella with respect to the stem after installation. In addition, the stabilizer portion also tends to help fill the elongated gap between adjacent portions of the body and windshield in order to form a tight interference fit to hold the molding in place and prevent contaminants and moisture from entering the gap. Preferably, the sawtooth-shaped gripping structures are designed to allow the stabilizing portion 32 to ratchet inwardly during installation by applying suitable pressure to that portion of the exterior surface, indicated generally at 40, lying directly above the stabilizer portion.

During installation of the molding 10 into gap 38, the barbed tip 20 is first inserted into the gap and the molding is arranged around the periphery of the windshield. Next, suitable pressure is applied to the exterior surface 26 to cause the stem 18 to be Forced downwardly into the gap, causing the barbed extensions to flex radially inwardly in the process. During this operation, the stabilizer portion 32 is also worked into the gap and pressure may be applied as at 40 to cause the stabilizer portion to ratchet inwardly and downwardly, thereby causing gripping structures 34 and 36 to lock together. The gripping structure is particularly effective in holding down the umbrella portion around bends and contours. The gripping structures are such that the stabilizer portion can be inserted into the gap to a greater or lesser extent, as needed, to maintain the exterior surface 36 in a relatively smooth, unbuckled configuration around curves and contours. For example, any local buckling, characterized by an upcurl in a section of the umbrella portion, can be corrected by simply ratcheting the stabilizer portion inwardly to a further extent at this location. Once ratcheted inwardly, the gripping structures 34 and 36 hold the umbrella portion in position.

From the foregoing it will be seen that the reveal molding of the invention is well adapted to a wide variety of applications where an elongated gap between two adjacent structural portions must be filled in a water-tight, attractive way. Although the invention has been illustrated and described in use around the periphery of a windshield, the invention can be adapted to a number of other uses and is therefore not limited to windshield applications.

Accordingly, while the invention has been described in its presently preferred form, it will be understood that the invention is capable to modification and variation without departing from the spirit of invention as set forth in the appended claims.

What is claimed is:

1. A reveal molding for covering an elongated gap between two adjacent structural portions comprising:
   a stem portion for insertion into said gap;
   an umbrella portion connected to the stem portion for covering the adjacent structural portions which define said gap;
   a stabilizer portion connected to the umbrella portion for insertion into said gap adjacent said stem portion;
   said stem portion and said stabilizer portion having coacting gripping means for locking together to thereby inhibit said umbrella portion from moving away from said structural portions.

2. The molding of claim 1 wherein said one of said structural portions is glass.

3. The molding of claim 1 wherein said one of said structural portions is a windshield.

4. The molding of claim 1 wherein said stem portion includes means for engaging at least one of the structural portions to inhibit removal of the stem portion from said gap.

5. The molding of claim 4 wherein said means comprises a plurality of barbs.

6. The molding of claim 1 wherein said stem portion includes means for engaging both of the structural portions to inhibit removal of the stem portion from said gap.

7. The molding of claim 6 wherein said means comprises a plurality of barbs.

8. The molding of claim 1 wherein said gripping means comprises sawtooth formations on adjacent portions of said stem portion and said stabilizer portion.

9. The molding of claim 1 wherein said reveal molding comprises a polyvinyl plastic material.

10. The molding of claim 1 wherein said reveal molding comprises a plastic material of 85 shore A hardness.

11. The molding of claim 1 wherein said umbrella portion defines a central axis and wherein said stem portion lies substantially on said central axis.

12. The molding of claim 1 wherein said umbrella portion defines a central axis and wherein said stabilizer portion lies substantially offset from said central axis.

13. The molding of claim 1 wherein said stem portion and said umbrella portion form a flexible hinge and wherein said umbrella portion is flexible about said hinge so as to adjustably cover adjacent structural portions having surfaces which lie in different planes.

14. The molding of claim 1 wherein said gripping means functions to hold said umbrella portion in contact with at least one of said adjacent structural portions.

* * * * *